United States Patent
Mori

(10) Patent No.: US 11,580,588 B2
(45) Date of Patent: Feb. 14, 2023

(54) SALES SYSTEM, SERVER, AND PROCESSING METHOD FOR SALES SYSTEM

(71) Applicant: NEC Corporation, Tokyo (JP)

(72) Inventor: Aika Mori, Tokyo (JP)

(73) Assignee: NEC CORPORATION, Tokyo (JP)

(*) Notice: Subject to any disclaimer, the term of this patent is extended or adjusted under 35 U.S.C. 154(b) by 589 days.

(21) Appl. No.: 16/497,899

(22) PCT Filed: Jan. 10, 2018

(86) PCT No.: PCT/JP2018/000240
§ 371 (c)(1),
(2) Date: Sep. 26, 2019

(87) PCT Pub. No.: WO2018/179665
PCT Pub. Date: Oct. 4, 2018

(65) Prior Publication Data
US 2020/0027152 A1    Jan. 23, 2020

(30) Foreign Application Priority Data
Mar. 29, 2017   (JP) .............................. JP2017-064527

(51) Int. Cl.
*G06Q 30/06*    (2012.01)
*G06Q 30/0601*  (2023.01)
(Continued)

(52) U.S. Cl.
CPC ......... *G06Q 30/0633* (2013.01); *G06F 21/64* (2013.01); *G06Q 20/204* (2013.01);
(Continued)

(58) Field of Classification Search
CPC ........ G06Q 30/02; G06Q 30/06; G06Q 10/06; G06Q 20/343; G07G 1/14
(Continued)

(56) References Cited

U.S. PATENT DOCUMENTS 7,356,490 B1 *   4/2008  Jacobi ................ G06Q 30/0631
                                                    705/26.8
2003/0177072 A1 * 9/2003  Bared ................ G06Q 30/0623
                                                    705/26.81
(Continued)

FOREIGN PATENT DOCUMENTS

JP      10-105600 A      4/1998
JP      2003-122980 A    4/2003
(Continued)

OTHER PUBLICATIONS

Indian Office Action for IN Application No. 201917038547 dated May 15, 2021.
(Continued)

*Primary Examiner* — Olusegun Goyea

(57) ABSTRACT

According to the present invention, there is provided a sales system (10) that includes a plurality of information acquisition units (11-1 to 11-N (N is an integer equal to or greater than 2)) installed for a plurality of respective products, a registration unit (12) that registers a product corresponding to a first information acquisition unit (11-A (A is an integer equal to or greater 1 and equal to or smaller than N)) in association with customer identification information when the customer identification information is input through the first information acquisition unit (11-A), a reception unit (13) that receives a request for a product list associated with the customer identification information from a customer terminal, and a transmission unit (14) that transmits the product list to the customer terminal in response to the request.

8 Claims, 13 Drawing Sheets

(51) Int. Cl.
  *G06F 21/64* (2013.01)
  *G06Q 20/20* (2012.01)
  *G06Q 30/02* (2023.01)
  *H04L 9/32* (2006.01)

(52) U.S. Cl.
  CPC ........... *G06Q 20/208* (2013.01); *G06Q 30/02* (2013.01); *H04L 9/3247* (2013.01)

(58) Field of Classification Search
  USPC ........................................ 235/383, 381, 375
  See application file for complete search history.

(56) References Cited

U.S. PATENT DOCUMENTS

| | | | | |
|---|---|---|---|---|
| 2004/0079797 | A1* | 4/2004 | Wadley | G06K 19/0776 235/487 |
| 2004/0195308 | A1* | 10/2004 | Wagner | G06Q 10/06 235/375 |
| 2005/0203810 | A1* | 9/2005 | Listenberg | G07F 7/00 705/26.8 |
| 2005/0230472 | A1* | 10/2005 | Chang | G07G 1/14 235/383 |
| 2005/0261987 | A1* | 11/2005 | Bezos | G06Q 30/0631 705/26.44 |
| 2006/0124733 | A1* | 6/2006 | Matthews | G06Q 30/02 235/383 |
| 2012/0259741 | A1* | 10/2012 | Iwabuchi | G06Q 30/0255 705/27.1 |
| 2014/0019241 | A1* | 1/2014 | Treiser | G06Q 30/0609 705/26.35 |
| 2014/0316916 | A1* | 10/2014 | Hay | G06Q 20/20 705/17 |
| 2016/0217418 | A1* | 7/2016 | Stutzbach | G06Q 10/087 |
| 2016/0292710 | A1* | 10/2016 | Casselle | G06Q 30/0211 |
| 2017/0255838 | A1* | 9/2017 | Norieda | G06V 20/20 |
| 2018/0011941 | A1* | 1/2018 | Cypher | G06Q 30/0261 |
| 2018/0089725 | A1* | 3/2018 | Muramatsu | G06Q 30/02 |
| 2018/0144389 | A1* | 5/2018 | Fredrich | G06Q 30/0271 |
| 2018/0374048 | A1* | 12/2018 | Minami | H04W 12/08 |
| 2019/0005143 | A1* | 1/2019 | Cypher | G06K 7/10366 |
| 2019/0361943 | A1* | 11/2019 | Cypher | G06K 7/1443 |
| 2020/0027152 | A1* | 1/2020 | Mori | G06Q 20/204 |

FOREIGN PATENT DOCUMENTS

| | | | |
|---|---|---|---|
| JP | 2005-293076 A | 10/2005 | |
| JP | 2015102988 | * 11/2013 | ............... G07G 1/01 |
| JP | 2015-102988 A | 6/2015 | |
| WO | 2014/175384 A1 | 10/2014 | |

OTHER PUBLICATIONS

International Search Report of PCT/JP2018/000240 dated Feb. 13, 2018.

* cited by examiner

FIG. 4

| CUSTOMER IDENTIFICATION INFORMATION | PRODUCT 1 | | ... | PRODUCT 2 | | ... |
|---|---|---|---|---|---|---|
| | PRODUCT ID | QUANTITY | | PRODUCT ID | QUANTITY | |
| . . . . | . . . . | . . . . | . . . . | . . . . | . . . . | . . . . |

FIG. 12

| CUSTOMER IDENTIFICATION INFORMATION | BIOMETRIC INFORMATION |
|---|---|
| ⋮ | ⋮ |

FIG. 13

| CUSTOMER IDENTIFICATION INFORMATION | BIOMETRIC INFORMATION | | |
|---|---|---|---|
| | USER 1 | USER 2 | ・・・ |
| ⋮ | ⋮ | ⋮ | ⋮ |

SALES SYSTEM, SERVER, AND PROCESSING METHOD FOR SALES SYSTEM

CROSS REFERENCE TO RELATED APPLICATIONS

This application is a National Stage of International Application No. PCT/JP2018/000240 filed Jan. 10, 2018, claiming priority based on Japanese Patent Application No. 2017-064527 filed Mar. 29, 2017, the disclosure of which are incorporated herein in their entirety.

TECHNICAL FIELD

The present invention relates to a sales system, a server, processing method for the sales system, processing method for the server, and a program.

BACKGROUND ART

In Patent Document 1, a product sales system that includes a store server and camera-mounted mobile terminals capable of accessing the store server is disclosed. A shopper images a barcode attached to a sample of the product desired to purchase using the mobile terminal. By this operation, barcode data of one or a plurality of products desired to purchase are recorded in the mobile terminal. Then, the recorded barcode data is transmitted to the store server.

The store server generates an ordered products list based on the received barcode data and transmits the list to the mobile terminal. Thereafter, the shopper checks the ordered products list displayed on the mobile terminal and performs an operation such as order confirmation.

In Patent Document 2, a product sales system is disclosed, which includes an ID (identifier) reader placed in the store corresponding to the product, and a recognition apparatus that stores the customer ID for the store, a membership card from which the ID can be read by the ID reader, and a recognition apparatus that is connected to the ID reader and recognizes the product as a product of which purchase is reserved by the customer according to the ID read by the ID reader.

The shopper holds his/her membership card over the ID reader corresponding to the product he/she wants to purchase. Then, the ID reader transmits the acquired customer ID and a device ID of itself to the recognition apparatus. The shopper goes to a delivery area or to a settlement area within a predetermined time. The shopper then checks the purchase reservation list displayed on the recognition apparatus and receives the product.

RELATED DOCUMENT

Patent Document

[Patent Document 1] Japanese Patent Application Publication No. 2005-293076
[Patent Document 2] Japanese Patent Application Publication No. 2015-102988

SUMMARY OF THE INVENTION

Technical Problem

In a case of the product sales system disclosed in Patent Document 1, the customer has to image the barcode. Some shoppers find it bothersome to search for the barcodes attached to the products and to perform an operation of imaging the barcodes so as to be recognized.

In a case of the product sales system disclosed in Patent Document 2, the shopper cannot check the registered purchase list at an area other than the delivery area or the settlement area. Some shoppers feel it inconvenient that they cannot check the purchase reservation list at another timing.

The present invention has an object to solve the above-described problem.

Solution to Problem

According to the present invention, there is provided a sales system that includes
a plurality of information acquisition units correspondingly installed for a plurality of respective products,
a registration unit that registers a product corresponding to a first information acquisition unit in association with customer identification information when the customer identification information is input through the first information acquisition unit,
a reception unit that receives a request for a product list associated with the customer identification information from a customer terminal, and
a transmission unit that transmits the product list to the customer terminal in response to the request.

In addition, according to the present invention, there is provided a server that includes
a registration unit that registers a product corresponding to a first information acquisition unit in association with customer identification information when the customer identification information is input through the first information acquisition unit among a plurality of information acquisition units correspondingly installed for a plurality of respective products,
a reception unit that receives a request for a product list associated with the customer identification information from a customer terminal, and
a transmission unit that transmits the product list to the customer terminal in response to the request.

In addition, according to the present invention, there is provided a processing method for a sales system that includes
a registration step of registering a product corresponding to a first information acquisition unit in association with customer identification information when the customer identification information is input through the first information acquisition unit,
a reception step of receiving a request for a product list associated with the customer identification information from a customer terminal, and
a transmission step of transmitting the product list to the customer terminal in response to the request.

The steps are executed by a computer in a store system having a plurality of information acquisition units correspondingly installed for a plurality of respective products.

In addition, according to the present invention, there is provided a program causing a computer in a store system having a plurality of information acquisition units correspondingly installed for a plurality of respective products to function as:
a registration unit that registers a product corresponding to a first information acquisition unit in association with customer identification information when the customer identification information is input through the first information acquisition unit, a reception unit that receives a request for a product list associated with the customer identification information from a customer terminal, and a transmission unit that transmits the product list to the customer terminal in response to the request.

In addition, according to the present invention, there is provided a processing method for a server which is executed by a computer, the method including:

registering a product corresponding to a first information acquisition unit in association with customer identification information when the customer identification information is input through the first information acquisition unit among a plurality of information acquisition units correspondingly installed for a plurality of respective products, receiving a request for a product list associated with the customer identification information from a customer terminal, and transmitting the product list to the customer terminal in response to the request.

In addition, according to the present invention, there is provided a program causing a computer to function as:

a registration unit that registers a product corresponding to a first information acquisition unit in association with customer identification information when the customer identification information is input through the first information acquisition unit among a plurality of information acquisition units correspondingly installed for a plurality of respective products, a reception unit that receives a request for a product list associated with the customer identification information from a customer terminal, and a transmission unit that transmits the product list to the customer terminal in response to the request.

Advantageous Effects of Invention

According to the present invention, it is possible to register a product desired to purchase with a relatively simple operation, and to confirm the list of registered product list at a desired timing.

BRIEF DESCRIPTION OF THE DRAWINGS

The objects described above, and other objects, features, and advantages will become more apparent from the preferred embodiments described below and the following drawings associated therewith.

FIG. 4 is a diagram schematically illustrating an example of data processed by the sales system in the present example embodiment.

FIG. 12 is a diagram schematically illustrating an example of data processed by the sales system in the present example embodiment.

FIG. 13 is a diagram schematically illustrating an example of data processed by the sales system in the present example embodiment.

DESCRIPTION OF EMBODIMENTS

First Example Embodiment

Figure 1:
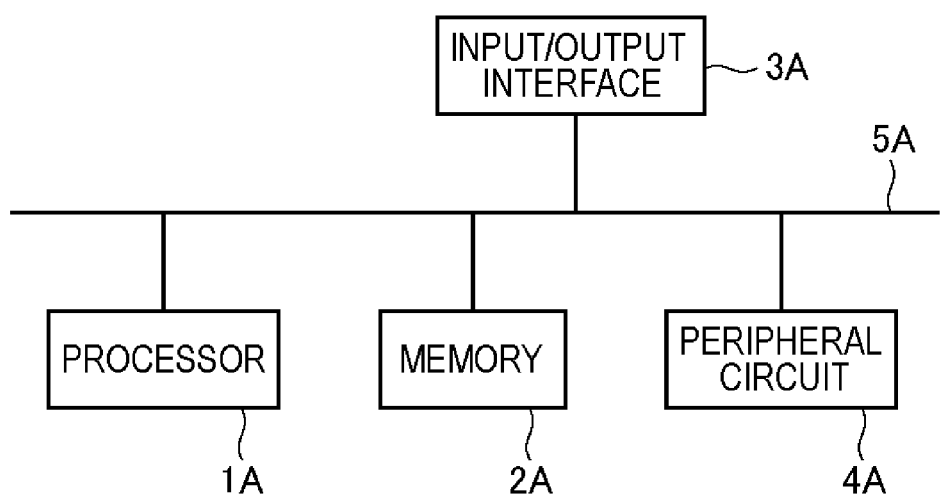
FIG. 1 is a diagram conceptually illustrating an example of a hardware configuration of a sales system in the present example embodiment.

First, an overview of a sales system will be described in the present example embodiment. In a store that uses the sales system in the present example embodiment, product samples are displayed on display shelf unit. In addition, in the display shelf unit, an information acquisition unit for acquiring customer identification information is provided in association with each product.

The customer checks the product by looking at the product samples and picking up the product sample. Then, the customer inputs his/her customer identification information through the information acquisition unit corresponding to the product determined to be purchased. By this operation, the customer can register the product determined to be purchased in the sales system in association with his/her customer identification information. Then, by repeating the operation, the customer can register a plurality of products determined to be purchased in the sales system in association with his/her customer identification information.

The customer performs a payment for the product registered in association with his/her customer identification information at any timing. The store also prepares the product to be delivered to the customer on the basis of the information registered in association with each piece of customer identification information at any timing. That is, the actual articles of the products registered in association with each piece of customer identification information are gathered and packaged. The preparation operation may be performed manually or may be performed by a machine. Then, the customer receives the actual articles of the registered products at a predetermined place in the store.

In the sales system in the present example embodiment, it should be noted that the customer operates his/her customer terminal at any timing, and can request the product list registered in association with his/her customer identification information from the sales system. Then, the customer can cause the product list registered in association with his/her customer identification information to be displayed on his/her customer terminal and can check the product list.

According to the sales system, the product desired to purchase can be registered in the sales system by a relatively simple operation of such as "inputting his/her customer identification information through the information acquisition unit corresponding to the product desired to purchase". In addition, at a desired timing, the product list registered in association with his/her customer identification information of the customer can be displayed on his/her customer terminal and can be checked.

Next, the configuration of the sales system will be described in detail. First, an example of a hardware configuration of the sales system will be described. The sales system is configured with any combination of hardware and software of any computer mainly focusing on a central processing unit (CPU), a memory, a program loaded in the memory, a storage unit such as a hard disk for storing the program (in addition to the program stored in advance from the stage of shipping the apparatus, a program downloaded from a storage medium such as a compact disc (CD) or a server or the like on the Internet can also be stored), and an interface for network connection. Also, it is understood by those skilled in the art that there are various modification examples in the configuration method and the apparatus.

FIG. 1 is a block diagram illustrating an example of the hardware configuration of the sales system. As illustrated in FIG. 1, the sales system includes a processor 1A, a memory 2A, an input/output interface 3A, a peripheral circuit 4A, and a bus 5A. The peripheral circuit 4A includes various modules.

The bus 5A is a data transmission path for the processor 1A, the memory 2A, the peripheral circuit 4A, and the input/output interface 3A to mutually transmit and receive data. The processor 1A is, for example, an arithmetic processing device such as a central processing unit (CPU) or a graphics processing unit (GPU). The memory 2A is, for example, a memory such as a random access memory (RAM) or a read only memory (ROM). The input/output interface 3A includes an interface for acquiring information from an input device (for example, a keyboard, a mouse, a microphone, physical keys, a touch panel display, a reader, and the like), an external device, an external server, and the like, and an interface for outputting information to an output device (for example, a display, speaker, printer, emailer, and the like), the external device, the external server, and the like. The processor 1A can issue an instruction to each module and can perform an operation based on the result of the arithmetic operation.

The sales system may be configured with one physically and/or logically integrated apparatus, or may be configured with a plurality of devices physically and/or logically divided.

Figure 2:
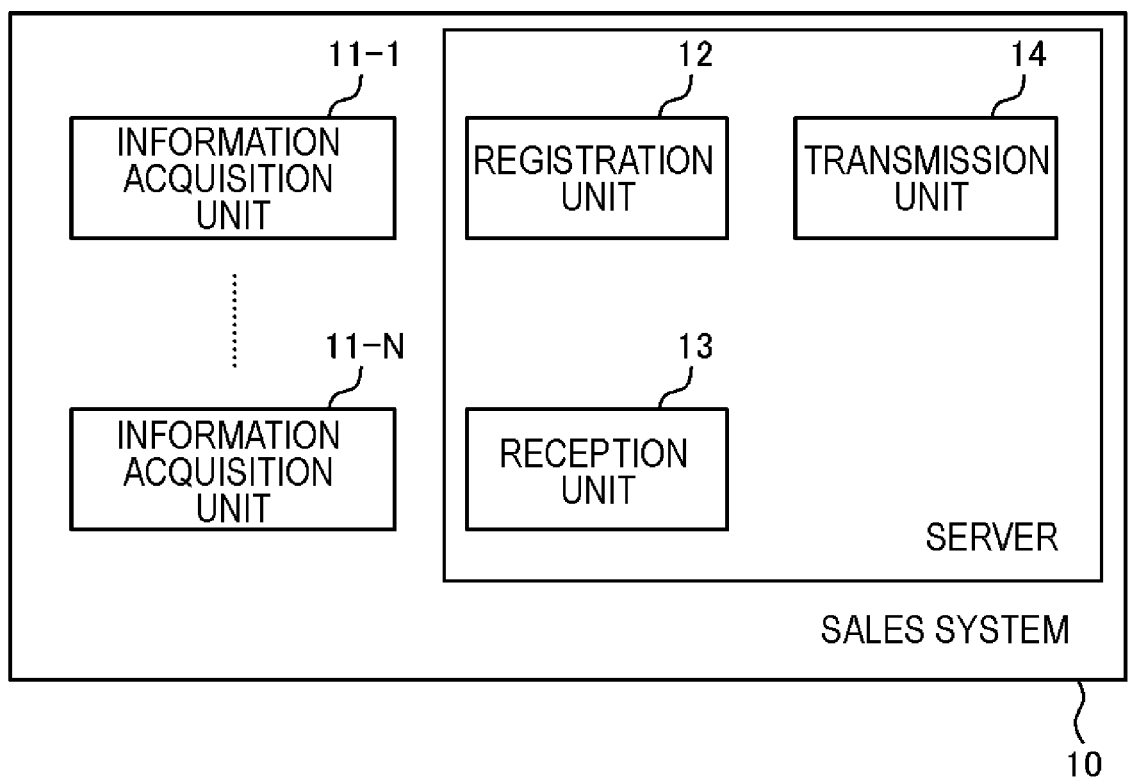
FIG. 2 is an example of a functional block diagram of the sales system in the present example embodiment.

An example of a functional block diagram of the sales system 10 is illustrated in FIG. 2. As illustrated, the sales system 10 includes a plurality of information acquisition units 11-1 to 11-N (N is an integer equal to or greater than 2), a registration unit 12, a reception unit 13, and a transmission unit 14.

The plurality of information acquisition units 11-1 to 11-N are N apparatuses physically separated from one another. The registration unit 12, the reception unit 13 and the transmission unit 14 are included in a server physically separated from the plurality of information acquisition units 11-1 to 11-N. Hereinafter, the server including the registration unit 12, the reception unit 13 and the transmission unit 14 will be simply referred to as a "server". The server may be installed in each store, or may be installed in a center that performs overall management of a plurality of stores. Each of the plurality of information acquisition units 11-1 to 11-N and the server are configured to be communicable.

The information acquisition units 11-1 to 11-N acquire customer identification information. The information acquisition units 11-1 to 11-N may be, for example, readers that communicate with electronic cards (for example, integrated circuit (IC) cards), electronic tags (for example, IC tags), mobile terminals (for example, smart phones, mobile phones, or the like) in a contact manner or a non-contact manner to acquire the customer identification information stored in the above-described devices. In addition, the information acquisition units 11-1 to 11-N may be physical keys and touch panel displays, and may receive direct input of the customer identification information through those devices. In addition, the information acquisition units 11-1 to 11-N may be cameras, fingerprint sensors, microphones, and the like, and may acquire biometric information such as face images, irises, fingerprints, voiceprints and the like. In this case, the biometric feature values of each customer are registered in advance in association with the customer identification information, and the predetermined customer identification information is extracted using the registration information and the biometric information input through the information acquisition units 11-1 to 11-N.

The information acquisition units 11-1 to 11-N are installed corresponding to a plurality of respective products on the display shelf unit. Each of the information acquisition units 11-1 to 11-N transmits, for example, the information for identifying the corresponding product and the acquired customer identification information in association with each other to the server. In this case, each of the information acquisition units 11-1 to 11-N may store the information for identifying the corresponding product in advance. In addition, each of the information acquisition units 11-1 to 11-N may transmit information for identifying the terminal itself (for example, the reader) and the acquired customer identification information in association with each other to the server. In this case, each of the information acquisition units 11-1 to 11-N stores the information for identifying the terminal itself in advance. In addition, the server holds correspondence information in which each of the information acquisition units 11-1 to 11-N is associated with the product corresponding to the information acquisition unit.

Figure 3:
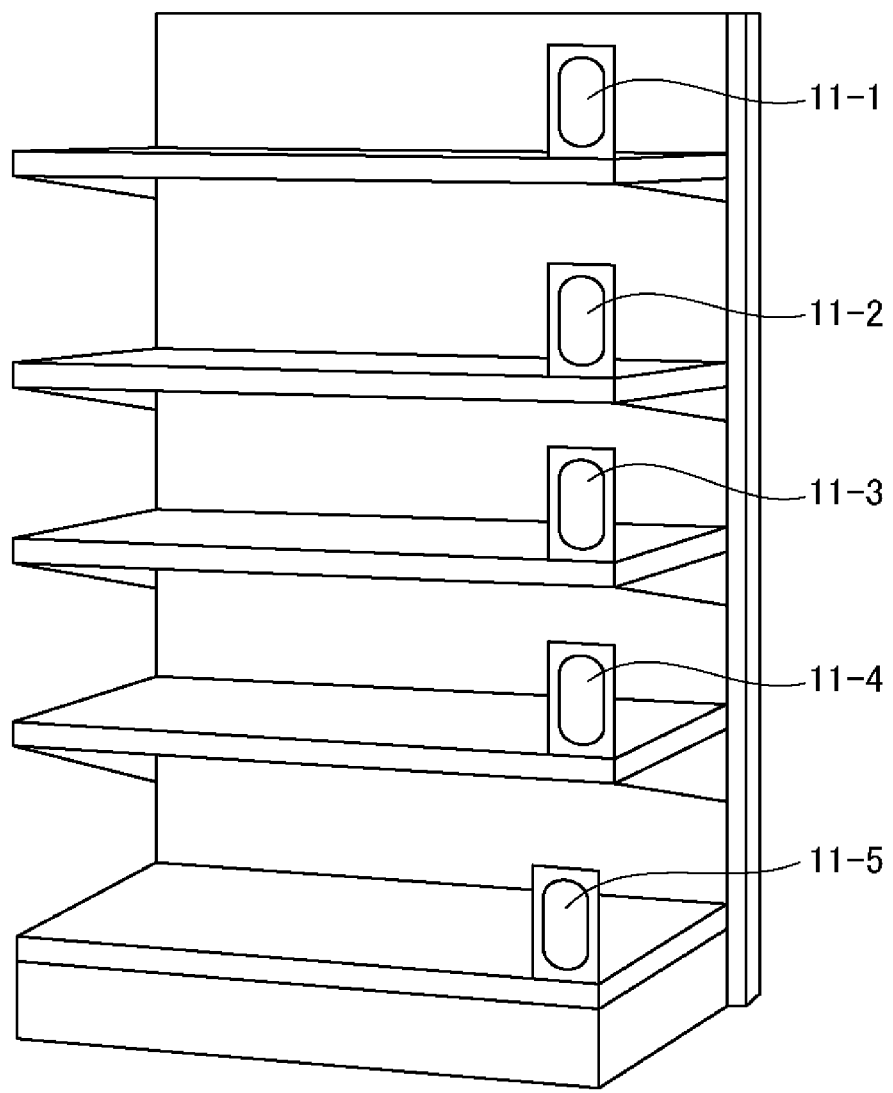
FIG. 3 is a diagram schematically illustrating an example of a display shelf unit in the present example embodiment.

An example of a display shelf unit 100 is schematically illustrated in FIG. 3. In the drawing, a display shelf unit 100 with five levels is displayed. On the display shelf unit 100, five types of product samples (not shown in the drawings) are displayed. One level is assigned to each of five types of product samples. The information acquisition units 11-1 to 11-5 are provided corresponding to respective levels. In the drawing, readers which are an example of the information acquisition units 11-1 to 11-N are illustrated.

Returning to FIG. 2, when customer identification information is input through a first information acquisition unit 11-A (A is an integer equal to or greater than 1 and equal to or smaller than N) which is any one of the information acquisition units 11-1 to 11-N, the registration unit 12 registers the product corresponding to the first information acquisition unit 11-A in association with the input customer identification information.

An example of the information registered by the registration unit 12 is schematically illustrated in FIG. 4. In the illustrated information, information on one or a plurality of products can be registered in association with the customer identification information. The information on each product includes a product ID (identifier) such as a product code, a purchasing quantity, and the like.

For example, when certain customer identification information are input M times (M is equal to or greater than 1) through the first information acquisition unit 11-A, the product corresponding to the first information acquisition unit 11-A is registered in association with the customer identification information, and M is registered as the purchasing quantity of that product. It should be noted that other means may be used as the method of specifying the purchasing quantity. For example, each of the information acquisition units 11-1 to 11-N may include any input device such as physical keys, a touch panel, a display, or a microphone. Each of the information acquisition units 11-1 to 11-N may receive the inputs specifying the purchasing quantity from the customer through the input device.

When the registration unit 12 registers the information on a certain product in association with certain customer identification information, it should be noted that the sales system 10 may notify the customer of that effect. The notification means is not particularly limited. For example, the customer may install a dedicated application (hereinafter sometimes referred to as a "dedicated application") for shopping using the sales system 10 on his/her customer terminal (for example, a smartphone, a tablet, a mobile phone, or the like), and may register his/her own customer identification information. Then, when information on a certain product is registered in association with certain customer identification information, the sales system 10 may perform a push notification toward the customer terminal corresponding to the customer identification information.

In addition, an e-mail address of each customer may be registered in the sales system 10 in advance in association with each piece of customer identification information. When the information on a certain product is registered in association with certain customer identification information, the sales system 10 may transmit an e-mail using the e-mail address associated with the customer identification information as the transmission destination.

A main message of the push notification and the e-mail may include the information for identifying the registered product, information relating to the product (for example, a price, a manufacturer, and the like), a registered date and time, information for identifying the store in which the operation for registration (input of the customer identification information) is performed.

Returning to FIG. 2, the reception unit 13 receives a request for the product list associated with the predetermined customer identification information, from the customer terminal. In response to the above-described request received by reception unit 13, the transmission unit 14 transmits the product list associated with the predetermined customer identification information, to the customer terminal.

For example, the customer may log in to the website of the sales system 10 using the dedicated application, and may transmit the above-described request to the server of the sales system 10 using the function included in the dedicated application. In addition, the customer may access the website of the sales system 10 through a web browser installed on the customer terminal, and may log in to the website using the customer identification information. Then, the customer may transmit the above-described request to a server of the sales system 10 using the function included in the website.

It should be noted that the customer identification information on each customer may be included in the request transmitted from the customer terminal to the server. In this case, the transmission unit 14 transmits the product list associated with the customer identification information included in the request, to the customer terminal. In addition, the sales system 10 may determine the customer identification information corresponding to each logged-in user on the basis of an identifier (ID) for logging in to the website. For example, the ID for the log-in may be the customer identification information. In addition, the sales system 10 may hold the correspondence information in which the ID for the log-in and the customer identification information are associated with each other, and the customer identification information of the logged-in user may be determined on the basis of the corresponding information. In this case, the transmission unit 14 transmits the product list associated with the determined customer identification information to the customer terminal.

Figure 5:
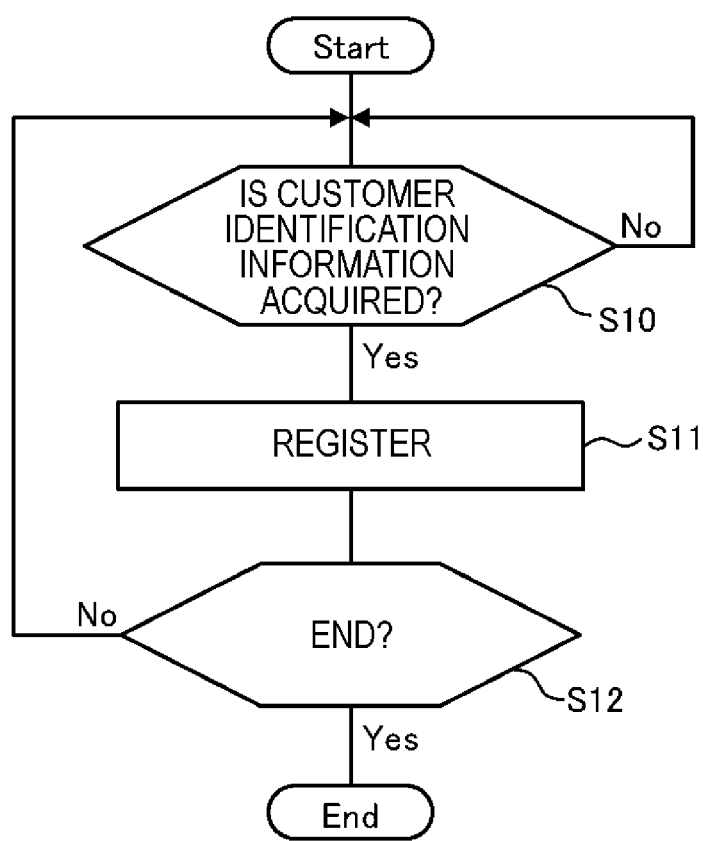
FIG. 5 is a flowchart illustrating an example of a processing flow of the sales system in the present example embodiment.

Next, an example of a processing flow by the sales system 10 in the present example embodiment will be described. First, an example of the processing flow by the information acquisition units 11-1 to 11-N and the registration unit 12 will be described using the flowchart in FIG. 5.

The information acquisition units 11-1 to 11-N are waiting for the input of the customer identification information (S10). When any first information acquisition unit 11-A among the information acquisition units 11-1 to 11-N acquires the customer identification information (Yes in S10), the registration unit 12 registers the information on the product corresponding to the first information acquisition unit 11-A in association with the customer identification information acquired by the first information acquisition unit 11-A (S11). Thereafter, if there is no input to end the processing (No in S12), the same process is repeated.

Subsequently, although not illustrated, the customer performs the settlement for the product registered in association with his/her customer identification information at any timing. In addition, the store prepares the product to be delivered to the customer on the basis of the information registered in association with each piece of customer identification information at any timing. That is, actual articles of the products registered in association with each piece of customer identification information are gathered and packaged. The preparation operation may be performed manually or may be performed by a machine. Then, the customer receives the actual articles of the registered products at a predetermined place in the store.

Figure 6:
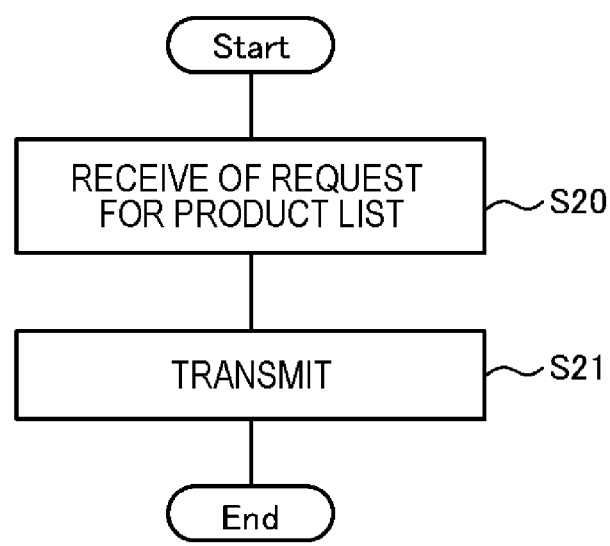
FIG. 6 is a flowchart illustrating an example of a processing flow of the sales system in the present example embodiment.

Next, an example of the processing flow by the reception unit 13 and the transmission unit 14 will be described with reference to the flowchart in FIG. 6.

When the reception unit 13 receives a request for the product list from the customer terminal (S20), in response to the request, the transmission unit 14 transmits the product list associated with the customer identification information corresponding to the customer terminal, to the customer terminal (S21). Subsequently, the product list is displayed on the customer terminal.

According to the sales system 10 in the present example embodiment described above, the customer can register the product to be purchased in the sales system 10 simply by performing the "relatively simple operation" such as inputting his/her customer identification information into the information acquisition units 11-1 to 11-N corresponding to the product to be purchased.

In addition, the customer operates his/her own customer terminal, and causes the product list registered in association with his/her customer identification information to be displayed on his/her customer terminal so as to be checked. Since above-described operation can be performed using his/her own customer terminal instead of the shared terminal installed in the store, the customer can perform the above-described checking operation at any time.

According to the sales system 10 described above, the product desired to purchase can be registered in the sales system 10 with relatively simple operation, and the registered product list can be checked at a desired timing.

In addition, according to the sales system 10 in the present example embodiment, when information on a certain product is registered in association with certain customer identification information, that effect can be notified to the customer. According to the sales system 10, the customer can immediately recognize that the product has been registered. Therefore, the customer can immediately recognize an unintended registration or can immediately recognize that the registration is performed as intended.

In addition, according to the sales system 10 in the present example embodiment, there is no need to display an actual article of the product to be delivered to the customer as long as the sample of the product is displayed on the display shelf unit. Therefore, it is possible to reduce the operation burden of displaying the actual article on the display shelf unit. In addition, the problem of illegally taking out the products can be reduced.

In addition, according to the sales system 10 in the present example embodiment, a person (for example, parent) who is in a position to monitor a person (for example, children) who goes to the store and performs shopping can monitor whether or not the shopping is properly performed by the checking operation through the customer terminal without actually being in the store. The sales system 10 in the present example embodiment described above is excellent in convenience.

Second Example Embodiment

The sales system 10 in the present example embodiment is different from the sales system 10 in the first example embodiment in a point of having a function of editing the product list registered in association with the customer identification information on the basis of an editing instruction received from the customer terminal. The description will be made as follows.

An example of a hardware configuration of the sales system 10 is the same as that in the first example embodiment.

Figure 7:
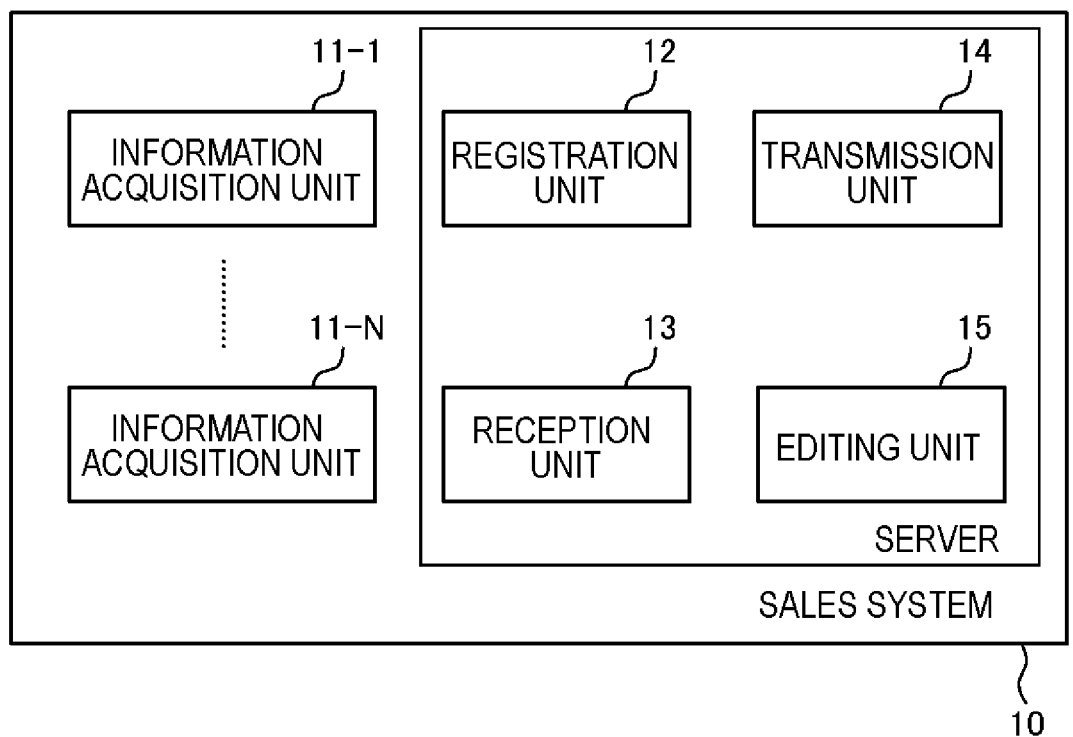
FIG. 7 is an example of a functional block diagram of a sales system in the present example embodiment.

An example of a functional block diagram of the sales system 10 is illustrated in FIG. 7. As illustrated, the sales system 10 includes a plurality of information acquisition units 11-1 to 11-N(N is an integer equal to or greater than 2), a registration unit 12, a reception unit 13, a transmission unit 14, and an editing unit 15. The editing unit 15 is included in the server.

The configurations of the information acquisition units 11-1 to 11-N, the registration unit 12 and the reception unit 13 are the same as those in the first example embodiment.

The editing unit 15 edits the product list associated with the customer identification information on the basis of the editing instruction received from the customer terminal.

As described in the first example embodiment, the customer can display the "product list associated with his/her customer identification information", that is, "the product list to be purchased" on his/her customer terminal and can check the product list. In the present example embodiment, the customer can transmit the editing instruction to change the content of the checked product list to the server of the sales system 10 through the customer terminal. The input of editing instruction and the transmission to the server of the sales system 10 are performed by, for example, the functions included in the dedicated application and a predetermined website of the sales system 10 described above.

The editing instruction may have a content to delete a part or all of the products included in the product list from the product list. The editing unit 15 deletes a part or all of the products instructed from the product list associated with certain customer identification information (cancel the registration), on the basis of the editing instruction.

In addition, the editing instruction may be a content to change the purchasing quantity of the product included in the product list. The editing unit 15 updates the content of the product list associated with certain customer identification information on the basis of the editing instruction. That is, the purchasing quantity of the instructed product is updated to the instructed value.

The transmission unit 14 transmits the edited product list to the customer terminal. For example, the transmission unit 14 may transmit the edited product list to the customer terminal each time the product list is edited. It should be noted that, the transmission unit 14 may have the functions described in the first example embodiment.

Next, an example of a processing flow by the sales system 10 in the present example embodiment will be described. It should be noted that an example of the processing flows by the information acquisition units 11-1 to 11-N and the registration unit 12 and an example of the processing flows by the reception unit 13 and the transmission unit 14 are similar to those in the first example embodiment.

Figure 8:
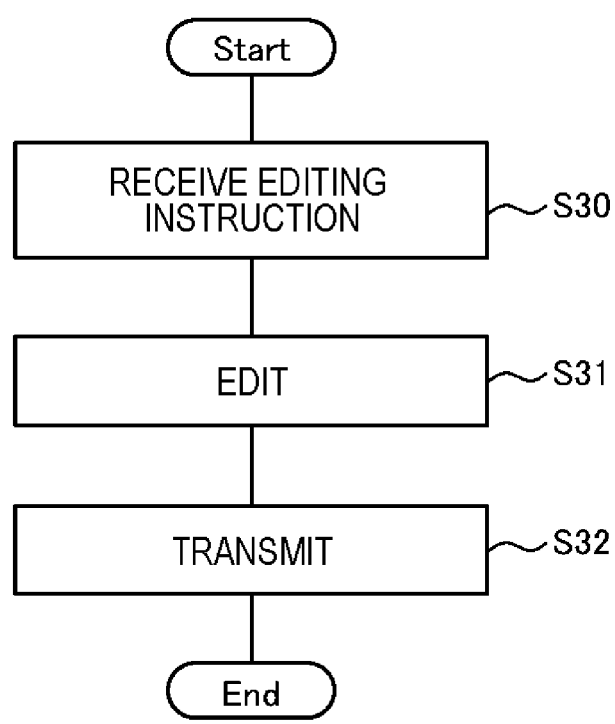
FIG. 8 is a flowchart illustrating an example of a processing flow of the sales system in the present example embodiment.

An example of the processing flow by the transmission unit 14 and the editing unit 15 will be described using the flowchart in FIG. 8.

When an editing instruction is received from the customer terminal (S30), the editing unit 15 edits the product list associated with the customer identification information corresponding to the customer terminal on the basis of the editing instruction (S31). Then, the transmission unit 14 transmits the edited product list to the customer terminal from which the editing instruction was transmitted (S32).

Thereafter, even though not illustrated, the customer performs the settlement for the product registered in association with his/her customer identification information at any timing. In addition, the store prepares the product to be delivered to the customer on the basis of the information registered in association with each piece of customer identification information at any timing. That is, actual articles of the products registered in association with each piece of customer identification information are gathered and packaged. The preparation operation may be performed manually or may be performed by a machine. Then, the customer receives the actual articles of the registered products at a predetermined place in the store.

According to the sales system 10 in the present example embodiment described above, the advantageous effects same as those in the first example embodiment can be realized.

In addition, according to the sales system 10 in the present example embodiment, the customer operates his/her own customer terminal, and causes the product list registered in association with his/her customer identification information to be displayed on his/her customer terminal so as to be checked, and furthermore, it is possible to edit the content thereof. Since above-described operation can be performed using his/her own customer terminal instead of the shared terminal installed in the store, the customer can perform the above-described editing operation at any time.

Third Example Embodiment

In the store where the sales system 10 in present example embodiment is used, the customer can select one of "receive the purchased product at the store and take it home" and "deliver the purchased product to a predetermined address".

If a plurality of products are purchased, it should be noted that the selection can be performed for each product.

In addition, the sales system 10 in the present example embodiment is different from the sales system 10 in the first example embodiment and in the second example embodiment in a point of having a function of editing the product list registered in association with the customer identification information on the basis of an editing instruction received from the customer terminal, more specifically, in a point of having a function of editing the products included in the product list to divide into the delivery desired products and take-home desired products. The description will be made as follows.

An example of a hardware configuration of the sales system 10 is the same as those in the first and second example embodiments.

An example of a functional block diagram of the sales system 10 is illustrated in FIG. 7. As illustrated, the sales system 10 includes a plurality of information acquisition units 11-1 to 11-N(N is an integer equal to or greater than 2), a registration unit 12, a reception unit 13, a transmission unit 14, and an editing unit 15.

The configurations of the information acquisition units 11-1 to 11-N, the registration unit 12 and the reception unit 13 are the same as those in the first and second example embodiments.

The editing unit 15 edits the product list associated with the customer identification information on the basis of the editing instruction received from the customer terminal.

As described in the first example embodiment, the customer can display the "product list associated with his/her customer identification information", that is, "the product list to be purchased" on his/her customer terminal and can check the product list. In the present example embodiment, the customer can transmit the editing instruction to change the content of the checked product list to the server of the sales system 10 through the customer terminal. The input of editing instruction and the transmission to the server of the sales system 10 are realized by, for example, the functions included in the dedicated application and a predetermined website of the sales system 10 described above.

The editing instruction may have a content to divide the products included in the product list into the delivery desired product and the take-home desired product. The editing unit 15 divides the products included in the product list associated with certain customer identification information into the delivery desired product and the take-home desired product on the basis of the editing instruction. For example, in the information indicated in FIG. 4, a value indicating the delivery desired product or the take-home desired product may be included in the information (product ID, quantity, or the like) on each of one or a plurality of products registered in association with each piece of customer identification information. Then, the editing unit 15 may update the value. Before editing on the basis of the editing instruction, it should be noted that a default value (for example, a value indicating the delivery desired product or a value indicating the take-home desired product) may be registered.

The sales system 10 may receive an input for specifying an address of a delivery destination from the customer terminal if there is a delivery desired product.

It should be noted that the editing unit 15 may have the functions described in the second example embodiment.

The transmission unit 14 transmits the edited product list to the customer terminal. For example, the transmission unit 14 may transmit the edited product list to the customer terminal each time the product list is edited. It should be noted that the transmission unit 14 may have the functions described in the first example embodiment and in the second example embodiment.

An example of the processing flow by the sales system 10 in the present example embodiment is similar to those in the first example embodiment and the second example embodiment.

According to the sales system 10 in the present example embodiment described above, the advantageous effects same as those in the first and the second embodiments can be realized.

In addition, according to the sales system 10 in the present example embodiment described above, the customer can take the purchased product home or have the product delivered. In addition, the customer can take some of the products home and have others delivered. By performing the appropriate selection according to the size and weight of the product, the timing of the product usage, and the like, and thus, the shopping can be easier.

In addition, according to sales system 10 of the present example embodiment, the customer can perform an operation of dividing the products into the delivery desired product and the take-home desired product, and an operation of specifying the address of the delivery destination by operating his/her own customer terminal. Since above-described operation can be performed using his/her own customer terminal instead of the shared terminal installed in the store, the customer can perform the above-described editing operation at any time.

Fourth Example Embodiment

The sales system 10 in the present example embodiment is different from the sales system 10 in the first to third example embodiments in a point that the settlement of the product registered in association with the customer identification information is performed on the basis of the information received from the customer terminal. That is, the customer can perform the settlement of the product to be purchased by the operation of the customer terminal. The description will be made as follows.

An example of a hardware configuration of the sales system 10 is the same as those in the first to third example embodiments.

Figure 9:
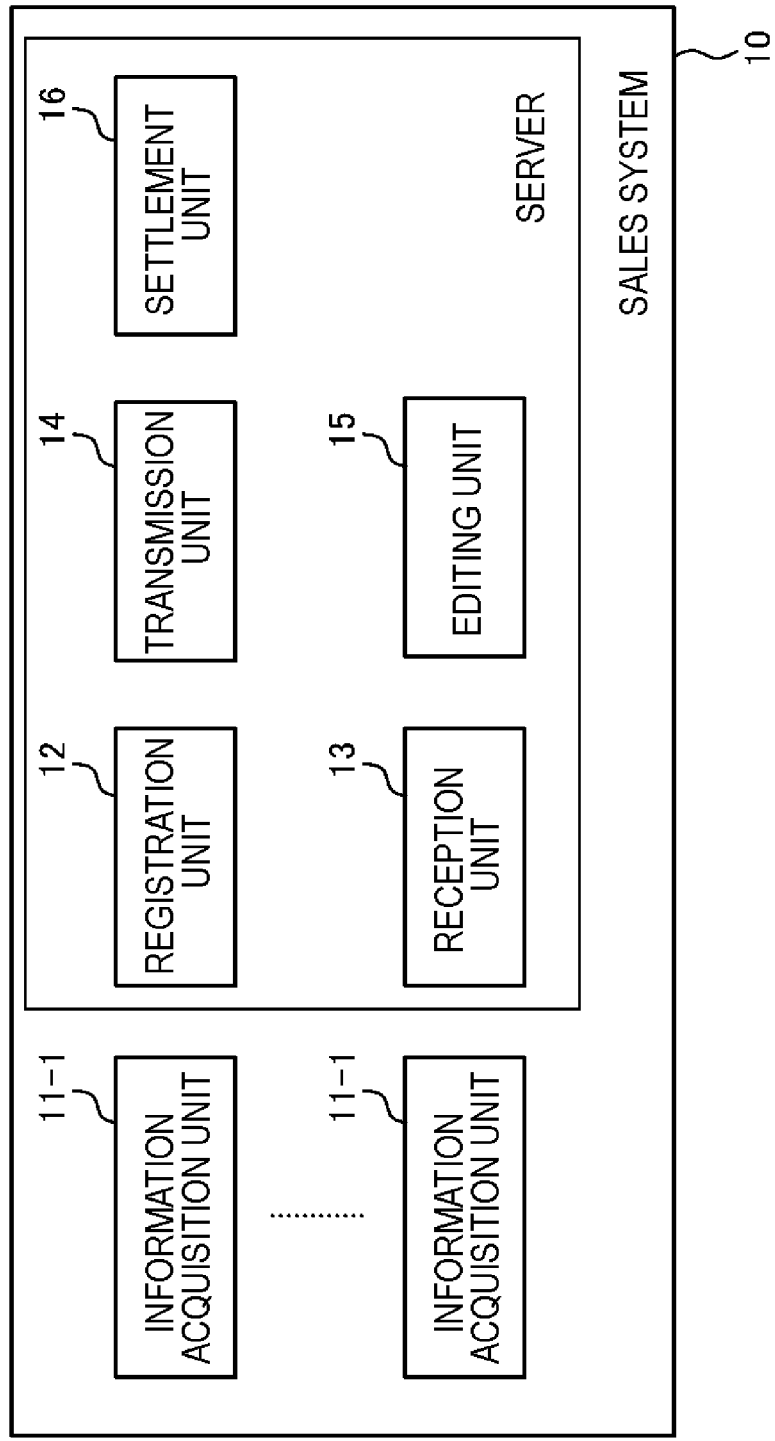
FIG. 9 is an example of a functional block diagram of a sales system in the present example embodiment.

An example of a functional block diagram of the sales system 10 is illustrated in FIG. 9. As illustrated, the sales system 10 includes a plurality of information acquisition units 11-1 to 11-N(N is an integer equal to or greater than 2), a registration unit 12, a reception unit 13, a transmission unit 14, an editing unit 15, and a settlement unit 16. It should be noted that the sales system may be configured without the editing unit 15. The settlement unit 16 can be provided in the server.

The configurations of the information acquisition units 11-1 to 11-N, the registration unit 12, the reception unit 13, the transmission unit 14, and the editing unit 15 are the same as those in the first to third example embodiments.

The settlement unit 16 performs the settlement processing for the products included in the product list on the basis of the information received from the customer terminal. A means for achieving online settlement processing is not particularly limited, and any technology can be adopted. For example, the settlement unit 16 may acquire credit card information (for example, a card number, an expiration date, an authentication code, a name of card, or the like) of each customer, and may perform the settlement using the credit card. In addition, the settlement can be performed using points. The instruction to start the settlement processing, the input of the information necessary for the settlement processing, and the transmission to the server of the sales system 10, and the like are performed by, for example, the functions provided in the dedicated application and a predetermined website of the sales system 10 described above.

Next, an example of the processing flow by the sales system 10 in the present example embodiment will be described. It should be noted that an example of the processing flows by the information acquisition units 11-1 to 11-N and the registration unit 12, an example of the processing flows by the reception unit 13 and the transmission unit 14, and an example of the processing flows by the transmission unit 14 and the editing unit 15 are similar to those in the first to third example embodiments.

Figure 10:
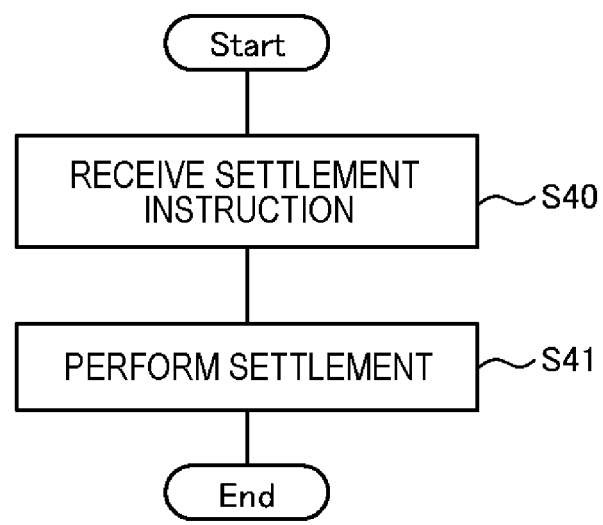
FIG. 10 is a flowchart illustrating an example of a processing flow of the sales system in the present example embodiment.

Next, an example of the processing flow by the settlement unit 16 will be described with reference to the flowchart in FIG. 10.

When the instruction to start the settlement processing from the customer terminal is received (S40), the settlement unit 16 performs the settlement processing (S41).

Specifically, the settlement unit 16 acquires information necessary for the settlement processing. The information necessary for the settlement processing is, for example, the total purchase amount computed on the basis of the product list associated with the customer identification information corresponding to the customer terminal, the credit card information, the point information and the like. Then, the settlement unit 16 performs the settlement processing for the total purchase amount on the basis of the acquired information.

Thereafter, even though not illustrated, the store prepares the product to be delivered to the customer on the basis of the information registered in association with each piece of customer identification information. That is, actual articles of the products registered in association with each piece of customer identification information are gathered and packaged. The preparation operation may be performed manually or may be performed by a machine. Then, the customer receives the actual articles of the registered products at a predetermined place in the store.

According to the sales system 10 in the present example embodiment described above, the advantageous effects same as those in the first to third example embodiments can be realized.

In addition, according to the sales system 10 in the present example embodiment, the customer can perform the settlement processing by operating his/her customer terminal. Since above-described operation can be performed using his/her own customer terminal instead of the shared terminal installed in the store, the customer can perform the above-described settlement processing at any time.

Fifth Example Embodiment

In the store where the sales system 10 in the present example embodiment is used, an apparatus for receiving the input of the customer identification information and biometric information is installed at any position. Using the information acquired by the apparatus, the sales system 10 performs authentication processing. If the authenticated customer identification information is input to the information acquisition units 11-1 to 11-N, the registration unit 12 registers the product associated with the customer identification information. That is, if the customer identification information that is not authenticated is input to the information acquisition units 11-1 to 11-N, the registration unit 12 does not register the product associated with the customer identification information. The sales system 10 in the present example embodiment is different from the sales system 10 in the first to fourth example embodiments in a point of having such an authentication function. The description will be made as follows.

An example of a hardware configuration of the sales system 10 is the same as that in the first to fourth example embodiments.

Figure 11:
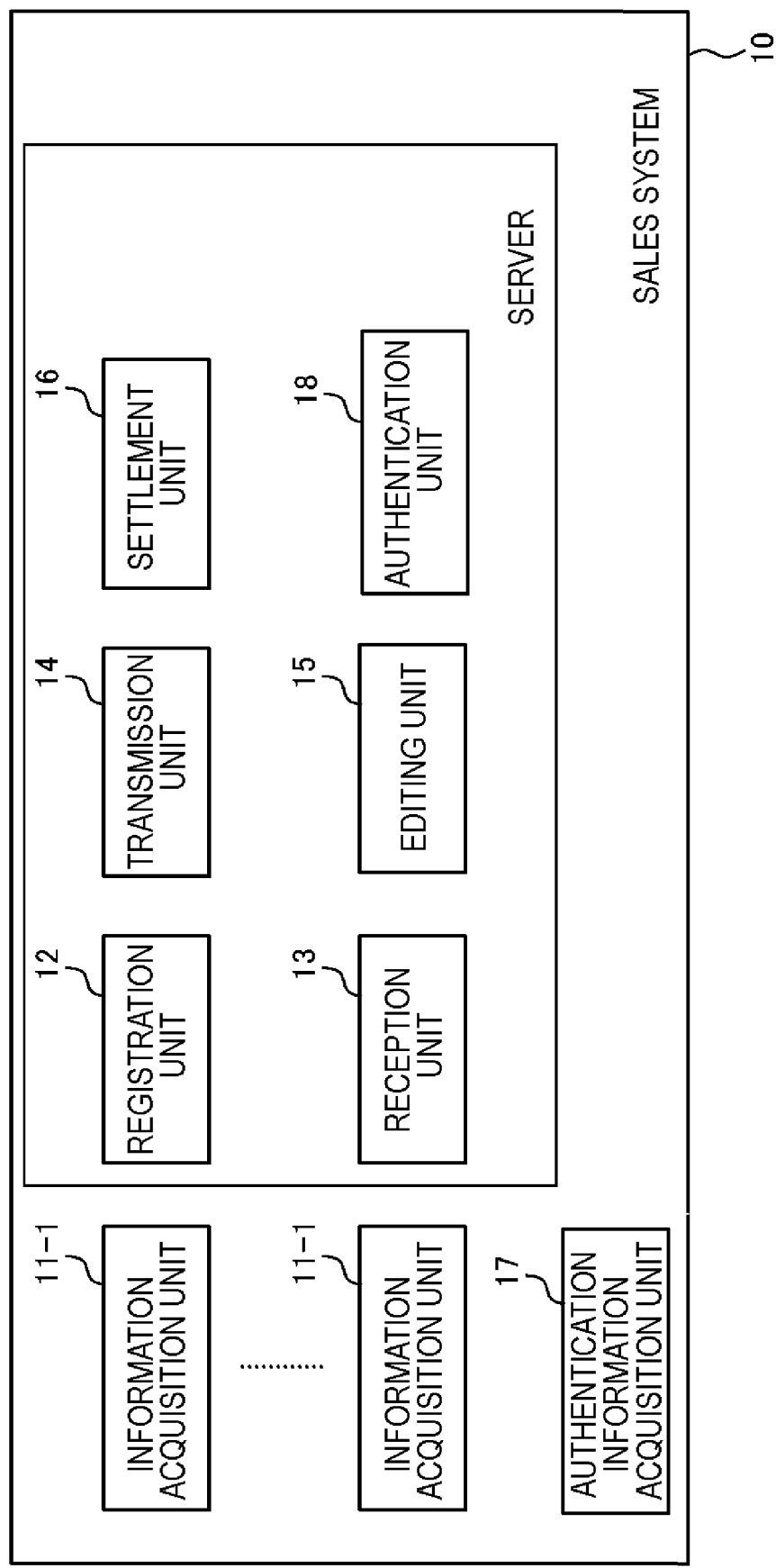
FIG. 11 is an example of a functional block diagram of a sales system in the present example embodiment.

An example of a functional block diagram of the sales system 10 is illustrated in FIG. 11. As illustrated, the sales system 10 includes a plurality of information acquisition units 11-1 to 11-N(N is an integer equal to or greater than 2), a registration unit 12, a reception unit 13, a transmission unit 14, an editing unit 15, a settlement unit 16, an authentication information acquisition unit 17, and an authentication unit 18. It should be noted that the sales system may be configured without at least one of the editing unit 15 and the settlement unit 16.

The configurations of the information acquisition units 11-1 to 11-N, the reception unit 13, the transmission unit 14, the editing unit 15, and the settlement unit 16 are the same as those in the first to fourth example embodiments.

The authentication information acquisition unit 17 acquires authentication information including the customer identification information and the biometric information on the customer. The authentication information acquisition unit 17 is provided in an apparatus that is physically separated from the information acquisition units 11-1 to 11-N and the server. The apparatus is installed at any position in the store (for example, near the entrance).

The authentication information acquisition unit 17 includes a means for acquiring the customer identification information. The authentication information acquisition unit 17 may be, for example, readers that communicate with electronic cards, electronic tags, mobile terminals in a contact manner or a non-contact manner, and acquires the customer identification information stored in the above-described devices. In addition, the authentication information acquisition unit 17 may be physical keys and a touch panel display, and may receive the direct input of the customer identification information through those devices.

In addition, the authentication information acquisition unit 17 includes a means for acquiring the biometric information. The authentication information acquisition unit 17 may be, for example, a camera, a fingerprint sensor, a microphone or the like, and may acquire the biometric information such as a face image, an iris, a fingerprint, a voice print, or the like.

The authentication information acquisition unit 17 transmits the acquired customer identification information and the biometric information in association with each other to the server.

The authentication unit 18 is included in the server. The authentication unit 18 performs the authentication processing on the basis of reference information (refer to FIG. 12) in which the customer identification information and the biometric information are registered in advance in association with each other and the authentication information (the customer identification information and the biometric information) acquired by the authentication information acquisition unit 17. When a pair of customer identification information and biometric information indicated by the authentication information acquired by the authentication information acquisition unit 17 is registered in the reference information, the authentication unit 18 authenticates the pair.

As illustrated in FIG. 13, in the reference information, it should be noted that the biometric information of a plurality of persons may be registered in association with one customer identification information. For example, if one piece of customer identification information is used by a plurality of persons such as a family, a company, a group, and the like, one piece of customer identification information is registered in association with the biometric information of a plurality of persons.

When the customer identification information authenticated in the authentication processing is input through the first information acquisition unit 11-A, the registration unit 12 registers the product corresponding to the first information acquisition unit 11-A in association with the customer identification information. It should be noted that the registration unit 12 may receive the above-described registration using the authenticated customer identification information only for a predetermined time from the authentication in the authentication processing. Although the predetermined time described above is a matter of design, it is sufficient to include one shopping time and not too long (for example, 1 hour or 2 hours). Other functions of the registration unit 12 are the same as those in the first to fourth example embodiments.

An example of the processing flow by the sales system 10 in the present example embodiment is the same as that in the first to fourth example embodiments.

According to the sales system 10 in the present example embodiment described above, it is possible to realize the advantageous effects same as those in the first to fourth example embodiments. In addition, according to the sales system 10 in the present example embodiment, it is possible to suppress the inconvenience of illegal use of the customer identification information.

Examples of reference example embodiments will be added as appendixes as follows.

1. A sales system including:
    a plurality of information acquisition units correspondingly installed for a plurality of respective products;
    a registration unit that registers a product corresponding to a first information acquisition unit in association with customer identification information when the customer identification information is input through the first information acquisition unit;
    a reception unit that receives a request for a product list associated with the customer identification information from a customer terminal; and
    a transmission unit that transmits the product list to the customer terminal in response to the request.
2. The sales system according to 1, further including:
    an editing unit that edits the product list on the basis of an editing instruction received from the customer terminal,
    in which the transmission unit transmits the edited product list to the customer terminal.
3. The sales system according to 2,
    in which the editing unit deletes a part or all of the products from the product list on the basis of the editing instruction.
4. The sales system according to 2 or 3,
    in which the editing unit divides the products included in the product list into a delivery desired product and a take-home desired product on the basis of the editing instruction.
5. The sales system according to any one of 1 to 4, further including:
    a settlement unit that performs settlement processing of the products included in the product list on the basis of information received from the customer terminal.
6. The sales system according to any one of 1 to 5,
    in which the plurality of information acquisition units are installed on a display shelf unit where respective samples for the plurality of products are displayed.
7. The sales system according to any one of 1 to 6, further including:
    an authentication information acquisition unit that acquires authentication information including the customer identification information and biometric information on a customer; and
    an authentication unit that performs authentication processing on the basis of reference information in which the customer identification information and the biometric information are registered in advance in association with each other and the authentication information acquired by the authentication information acquisition unit,
    in which, when the customer identification information authenticated in the authentication processing is input through the first information acquisition unit, the registration unit registers the product corresponding to the first information acquisition unit in association with the customer identification information.
8. A server including:
    a registration unit that registers a product corresponding to a first information acquisition unit in association with customer identification information when the customer identification information is input through the first information acquisition unit among a plurality of information acquisition units correspondingly installed for a plurality of respective products;
    a reception unit that receives a request for a product list associated with the customer identification information from a customer terminal; and
    a transmission unit that transmits the product list to the customer terminal in response to the request.
9. A processing method for a sales system executed by a computer in a store system having a plurality of information acquisition units correspondingly installed for a plurality of respective products, comprising:
    a registration step of registering a product corresponding to the first information acquisition unit in association with customer identification information when the customer identification information is input through the first information acquisition unit;
    a reception step of receiving a request for a product list associated with the customer identification information from a customer terminal; and
    a transmission step of transmitting the product list to the customer terminal in response to the request.
10. A program causing a computer in a store system having a plurality of information acquisition units correspondingly installed for a plurality of respective products to function as:
    a registration unit that registers a product corresponding to a first information acquisition unit in association with customer identification information when the customer identification information is input through the first information acquisition unit;
    a reception unit that receives a request for a product list associated with the customer identification information from a customer terminal; and
    a transmission unit that transmits the product list to the customer terminal in response to the request.
11. A processing method for a server which is executed by a computer, the method including:
    registering a product corresponding to a first information acquisition unit in association with customer identification information when the customer identification information is input through the first information acquisition unit among a plurality of information acquisition units correspondingly installed for a plurality of respective products;

receiving a request for a product list associated with the customer identification information from a customer terminal; and transmitting the product list to the customer terminal in response to the request.

12. A program causing a computer to function as:

a registration unit that registers a product corresponding to a first information acquisition unit in association with customer identification information when the customer identification information is input through the first information acquisition unit among a plurality of information acquisition units correspondingly installed for a plurality of respective products;

a reception unit that receives a request for a product list associated with the customer identification information from a customer terminal; and a transmission unit that transmits the product list to the customer terminal in response to the request.

The invention claimed is:

1. A sales system comprising:
a plurality of information acquisition units correspondingly installed for a plurality of respective products;
at least one memory configured to store one or more instructions; and
at least one processor configured to execute the one or more instructions to:
register a product corresponding to a first information acquisition unit in association with customer identification information when the customer identification information is input through the first information acquisition unit;
receive a request for a product list associated with the customer identification information from a customer terminal; and
transmit the product list to the customer terminal in response to the request;
wherein the processor is further configured to execute the one or more instructions to:
perform an authentication processing on a basis of reference information registered in advance and authentication information acquired through an authentication information acquisition unit, the reference information including the customer identification information and a biometric information, and the reference information including the customer identification information and the biometric information,
when the customer identification information, regarding which the authentication processing is successful, is input through the first information acquisition unit within a predetermined time after the authentication processing regarding the customer identification information is successful, register the product corresponding to the first information acquisition unit in association with the customer identification information,
wherein the authentication information acquisition unit is installed in a store, and acquires the authentication information from customers who come to the store.

2. The sales system according to claim 1,
wherein the processor is further configured to execute the one or more instructions to:
edit the product list on the basis of an editing instruction received from the customer terminal, and
transmit the edited product list to the customer terminal.

3. The sales system according to claim 2,
wherein the processor is further configured to execute the one or more instructions to delete a part or all of the products from the product list on the basis of the editing instruction.

4. The sales system according to claim 2,
wherein the processor is further configured to execute the one or more instructions to divide the products included in the product list into a delivery desired product and a take-home desired product on the basis of the editing instruction.

5. The sales system according to claim 1,
wherein the processor is further configured to execute the one or more instructions to perform settlement processing of the products included in the product list on the basis of information received from the customer terminal.

6. The sales system according to claim 1,
wherein the plurality of information acquisition units are installed on a display shelf unit where respective samples for the plurality of products are displayed.

7. A server comprising:
at least one memory configured to store one or more instructions; and
at least one processor configured to execute the one or more instructions to:
register a product corresponding to a first information acquisition unit in association with customer identification information when the customer identification information is input through the first information acquisition unit among a plurality of information acquisition units correspondingly installed for a plurality of respective products;
receive a request for a product list associated with the customer identification information from a customer terminal; and
transmit the product list to the customer terminal in response to the request;
wherein the processor is further configured to execute the one or more instructions to:
perform an authentication processing on a basis of reference information registered in advance and authentication information acquired through an authentication information acquisition unit, the reference information including the customer identification information and a biometric information, and the reference information including the customer identification information and the biometric information,
when the customer identification information, regarding which the authentication processing is successful, is input through the first information acquisition unit within a predetermined time after the authentication processing regarding the customer identification information is successful, register the product corresponding to the first information acquisition unit in association with the customer identification information,
wherein the authentication information acquisition unit is installed in a store, and acquires the authentication information from customers who come to the store.

8. A processing method for a sales system executed by a computer in a store system having a plurality of information acquisition units correspondingly installed for a plurality of respective products, comprising:
registering a product corresponding to a first information acquisition unit in association with customer identification information when the customer identification information is input through the first information acquisition unit;

receiving a request for a product list associated with the customer identification information from a customer terminal; and transmitting the product list to the customer terminal in response to the request;

wherein the processing method further comprises:

performing an authentication processing on a basis of reference information registered in advance and authentication information acquired through an authentication information acquisition unit, the reference information including the customer identification information and a biometric information, and the reference information including the customer identification information and the biometric information, when the customer identification information, regarding which the authentication processing is successful, is input through the first information acquisition unit within a predetermined time after the authentication processing regarding the customer identification information is successful, registering the product corresponding to the first information acquisition unit in association with the customer identification information, wherein the authentication information acquisition unit is installed in a store, and acquires the authentication information from customers who come to the store.

* * * * *